(12) United States Patent
Cherpeck

(10) Patent No.: US 6,221,116 B1
(45) Date of Patent: *Apr. 24, 2001

(54) AMINOCARBAMATES OF POLYALKYLPHENOXYALKANOLS AND FUEL COMPOSITIONS CONTAINING THE SAME

(75) Inventor: Richard E. Cherpeck, Cotati, CA (US)

(73) Assignee: Chevron Chemical Company, San Ramon, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,865

(22) Filed: Sep. 27, 1996

(51) Int. Cl.$^7$ .................................. C10L 1/18; C10L 1/22
(52) U.S. Cl. ............................ 44/387; 560/158; 560/159
(58) Field of Search .................... 560/158, 159; 44/387

(56) References Cited

U.S. PATENT DOCUMENTS

| | | |
|---|---|---|
| 3,849,085 | 11/1974 | Kreuz et al. . |
| 4,048,081 | 9/1977 | Machleder et al. . |
| 4,134,846 | 1/1979 | Machleder et al. . |
| 4,191,537 | 3/1980 | Lewis et al. . |
| 4,259,086 | 3/1981 | Machleder et al. . |
| 4,320,021 | 3/1982 | Lange . |
| 4,832,702 | 5/1989 | Kummer et al. . |
| 4,881,945 | * 11/1989 | Buckley, III .................. 44/387 |
| 4,933,485 | * 6/1990 | Buckley, III .................. 508/464 |
| 4,975,096 | * 12/1990 | Buckley, III .................. 44/433 |
| 5,112,364 | 5/1992 | Rath et al. . |
| 5,322,529 | * 6/1994 | Buckley, III .................. 44/387 |

FOREIGN PATENT DOCUMENTS

| | | | |
|---|---|---|---|
| 310875 | 4/1989 | (EP) | ............... C10L/1/22 |
| 2105539 | 4/1972 | (FR) | ........... C07C/93/100 |

* cited by examiner

Primary Examiner—Margaret Medley
Assistant Examiner—Cephia D. Toomer
(74) Attorney, Agent, or Firm—Claude J. Caroli

(57) ABSTRACT

Aminocarbamates of polyalkylphenoxyalkanols having the formula:

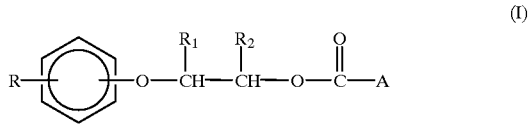

(I)

wherein R is a polyalkyl group having an average molecular weight in the range of about 600 to 5,000;

$R_1$ and $R_2$ are independently hydrogen or lower alkyl having 1 to 6 carbon atoms; and A is a polyamine moiety having at least one basic nitrogen atom, wherein the polyamine is connected to the carbonyl group through one of its nitrogen atoms to form a carbamate linkage.

The compounds of formula I are useful as fuel additives for the prevention and control of engine deposits.

33 Claims, No Drawings

AMINOCARBAMATES OF POLYALKYLPHENOXYALKANOLS AND FUEL COMPOSITIONS CONTAINING THE SAME

BACKGROUND OF THE INVENTION

1. Field of the Invention

This invention relates to novel aminocarbamates of polyalkylphenoxyalkanols. In a further aspect, this invention relates to the use of these compounds in fuel compositions to prevent and control engine deposits.

2. Description of the Related Art

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, aliphatic hydrocarbon-substituted phenols are known to reduce engine deposits when used in fuel compositions. U.S. Pat. No. 3,849,085, issued Nov. 19, 1974 to Kreuz et al., discloses a motor fuel composition comprising a mixture of hydrocarbons in the gasoline boiling range containing about 0.01 to 0.25 volume percent of a high molecular weight aliphatic hydrocarbon-substituted phenol in which the aliphatic hydrocarbon radical has an average molecular weight in the range of about 500 to 3,500. This patent teaches that gasoline compositions containing minor amounts of an aliphatic hydrocarbon-substituted phenol not only prevent or inhibit the formation of intake valve and port deposits in a gasoline engine, but also enhance the performance of the fuel composition in engines designed to operate at higher operating temperatures with a minimum of decomposition and deposit formation in the manifold of the engine.

U.S. Pat. No. 4,259,086, issued Mar. 31, 1981 to Machleder et al., discloses a detergent additive for fuels and lubricating oils which comprises the reaction product of an aliphatic hydrocarbon-substituted phenol, epichlorohydrin and a primary or secondary monoamine or polyamine. In addition, U.S. Pat. No. 4,048,081, issued Sep. 13, 1977 to Machleder et al., discloses a detergent additive for gasoline which is the reaction product of a polyisobutene phenol with epichlorohydrin, followed by amination with ethylene diamine or other polyamine.

Similarly, U.S. Pat. No. 4,134,846, issued Jan. 16, 1979 to Machleder et al., discloses a fuel additive composition comprising a mixture of (1) the reaction product of an aliphatic hydrocarbon-substituted phenol, epichlorohydrin and a primary or secondary mono- or polyamine, and (2) a polyalkylene phenol. This patent teaches that such compositions show excellent carburetor, induction system and combustion chamber detergency and, in addition, provide effective rust inhibition when used in hydrocarbon fuels at low concentrations. Amino phenols are also known to function as detergents/dispersants, antioxidants and anticorrosion agents when used in fuel compositions. U.S. Pat. No. 4,320,021, issued Mar. 16, 1982 to R. M. Lange, for example, discloses amino phenols having at least one substantially saturated hydrocarbon-based substituent of at least 30 carbon atoms. The amino phenols of this patent are taught to impart useful and desirable properties to oil-based lubricants and normally liquid fuels.

In addition, polybutylamines have been taught to be useful for preventing deposits in the intake system of internal combustion engines. For example, U.S. Pat. No. 4,832,702, issued May 23, 1989 to Kummer et al., discloses fuel and lubricant compositions containing polybutyl or polyisobutylamine additives prepared by hydroformulating a polybutene or polyisobutene and then subjecting the resulting oxo product to a Mannich reaction or amination under hydrogenating conditions.

Polyether amine fuel additives are also well known in the art for the prevention and control of engine deposits. These polyether additives have a polyoxyalkylene "backbone", i.e., the polyether portion of the molecule consists of repeating oxyalkylene units. U.S. Pat. No. 4,191,537, issued Mar. 4, 1980 to Lewis et al., for example, discloses a fuel composition comprising a major portion of hydrocarbons boiling in the gasoline range and from 30 to 2,000 ppm of a hydrocarbyl polyoxyalkylene aminocarbamate having a molecular weight from about 600 to 10,000, and at least one basic nitrogen atom. The hydrocarbyl polyoxyalkylene moiety is composed of oxyalkylene units having from 2 to 5 carbon atoms in each oxyalkylene unit. These fuel compositions are taught to maintain the cleanliness of intake systems without contributing to combustion chamber deposits.

Aromatic compounds containing a poly(oxyalkylene) moiety are also known in the art. For example, the above-mentioned U.S. Pat. No. 4,191,537, discloses alkylphenyl poly(oxyalkylene) polymers which are useful as intermediates in the preparation of alkylphenyl poly(oxyalkylene) aminocarbamates.

Similarly, U.S. Pat. No. 4,881,945, issued Nov. 21, 1989 to Buckley, discloses a fuel composition comprising a hydrocarbon boiling in the gasoline or diesel range and from about 30 to about 5,000 parts per million of a fuel soluble alkylphenyl polyoxyalkylene aminocarbamate having at least one basic nitrogen and an average molecular weight of about 800 to 6,000 and wherein the alkyl group contains at least 40 carbon atoms.

U.S. Pat. No. 5,112,364, issued May 12, 1992 to Rath et al., discloses gasoline-engine fuels which contain small amounts of a polyetheramine and/or a polyetheramine derivative, wherein the polyetheramine is prepared by reductive amination of a phenol-initiated or alkylphenol-initiated polyether alcohol with ammonia or a primary amine.

European Patent Application Publication No. 310,875, published Apr. 12, 1989 discloses fuels for spark ignition engines containing a polyetheramine additive prepared by first propoxylating and/or butoxylating an alkanol or primary or secondary alkylmonoamine and then aminating the resulting polyether with ammonia or a primary aliphatic amine. French Patent No. 2,105,539, published Apr. 28, 1972, discloses carburetor detergent additives which are phenoxypropylamines which may be substituted with up to five hydrocarbon radicals of 1 to 30 carbon atoms on the aromatic ring. This patent also discloses additives obtained by reacting such phenoxypropylamines with alkylphosphoric acids.

SUMMARY OF THE INVENTION

I have now discovered certain aminocarbamates of polyalkylphenoxyalkanols which provide excellent control of engine deposits, especially intake valve deposits, when employed as fuel additives in fuel compositions.

The compounds of the present invention include those having the following formula and fuel soluble salts thereof:

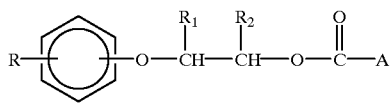
(I)

wherein R is a polyalkyl group having an average molecular weight in the range of about 600 to 5,000;

$R_1$ and $R_2$ are independently hydrogen or lower alkyl having 1 to 6 carbon atoms; and A is a polyamine moiety having at least one basic nitrogen atom, wherein the polyamine is connected to the carbonyl group through one of its nitrogen atoms to form a carbamate linkage.

The present invention further provides a fuel composition comprising a major amount of hydrocarbons boiling in the gasoline or diesel range and a deposit-controlling effective amount of a compound of the present invention.

The present invention additionally provides a fuel concentrate comprising an inert stable oleophilic organic solvent boiling in the range of from about 150° F. to 400° F. and from about 10 to 70 weight percent of a compound of the present invention.

Among other factors, the present invention is based on the surprising discovery that certain aminocarbamates of polyalkylphenoxyalkanols provide excellent control of engine deposits, especially on intake valves, when employed as additives in fuel compositions.

DETAILED DESCRIPTION OF THE INVENTION

The compounds of the present invention have the general formula:

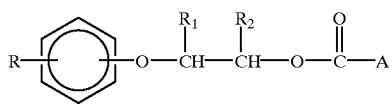
(I)

wherein R, $R_1$, $R_2$ and A are as defined above.

Preferably, R is a polyalkyl group having an average molecular weight in the range of about 600 to 3,000, more preferably about 700 to 3,000, even more preferably about 700 to 2,000, and most preferably about 900 to 2,000.

Preferably, one of $R_1$ and $R_2$ is hydrogen or lower alkyl of 1 to 4 carbon atoms, and the other is hydrogen. More preferably, one of $R_1$ and $R_2$ is hydrogen, methyl or ethyl, and the other is hydrogen. Most preferably, $R_2$ is hydrogen, methyl or ethyl, and $R_1$ is hydrogen.

A is preferably a polyamine moiety containing about 2 to about 12 amine nitrogen atoms and from about 2 to about 40 carbon atoms. More preferably, A is a polyamine moiety derived from a polyalkylene polyamine containing about 2 to about 12 nitrogen atoms and about 2 to about 24 carbon atoms. Still more preferably, A is a polyamine moiety derived from a polyalkylene polyamine having the formula:

$$H_2N-(R_3NH)_z-H$$

wherein $R_3$ is an alkylene group having about 2 to about 6 carbon atoms and z is an integer from about 1 to about 4.

Most preferably A is a polyamine moiety derived from ethylene diamine or diethylene triamine.

It is preferred that the R substituent is located at the meta or, more preferably, the para position on the aromatic ring, i.e., para or meta relative to the ether group.

The compounds of the present invention will generally have a sufficient molecular weight so as to be non-volatile at normal engine intake valve operating temperatures (about 200°–250° C.). Typically, the molecular weight of the compounds of this invention will range from about 800 to about 3,500, preferably from about 800 to about 2,500.

Fuel-soluble salts of the compounds of formula I can be readily prepared for those compounds containing an amino or substituted amino group and such salts are contemplated to be useful for preventing or controlling engine deposits. Suitable salts include, for example, those obtained by protonating the amino moiety with a strong organic acid, such as an alkyl- or arylsulfonic acid. Preferred salts are derived from toluenesulfonic acid and methanesulfonic acid.

Definitions

As used herein, the following terms have the following meanings unless expressly stated to the contrary.

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups are generally free of aliphatic unsaturation, i.e., olefinic or acetylenic unsaturation, but may contain minor amounts of heteroatoms, such as oxygen or nitrogen, or halogens, such as chlorine.

The term "alkyl" refers to both straight- and branched-chain alkyl groups.

The term "lower alkyl" refers to alkyl groups having 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, n-hexyl and the like.

The term "polyalkyl" refers to an alkyl group which is generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The term "fuel" or "hydrocarbon fuel" refers to normally liquid hydrocarbons having boiling points in the range of gasoline and diesel fuels.

General Synthetic Procedures

The compounds of this invention may be prepared by the following general methods and procedures. It should be appreciated that where typical or preferred process conditions (e.g., reaction temperatures, times, mole ratios of reactants, solvents, pressures, etc.) are given, other process conditions may also be used unless otherwise stated. Optimum reaction conditions may vary with the particular reactants or solvents used, but such conditions can be determined by one skilled in the art by routine optimization procedures.

The compounds of the present invention contain (a) a polyalkylphenoxyalkanol component, (b) an amine component, and (c) a carbamate connecting group which covalently links the polyalkylphenoxyalkanol component and the amine component.

A. The Polyalkylphenoxyalkanol Component

The compounds of the present invention may be prepared by a process which initially involves hydroxyalkylation of a polyalkylphenol of the formula:

(II)

wherein R is as defined herein, with an alkylene carbonate of the formula:

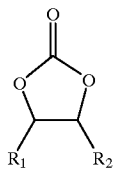
(III)

wherein $R_1$ and $R_2$ are as defined herein, in the presence of a catalytic amount of an alkali metal hydride or hydroxide, or alkali metal salt, to provide a polyalkylphenoxyalkanol of the formula:

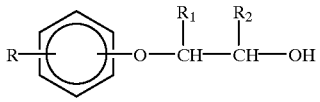
(IV)

wherein R, $R_1$ and $R_2$ are as defined herein.

The polyalkylphenols of formula II are well known materials and are typically prepared by the alkylation of phenol with the desired polyolefin or chlorinated polyolefin. A further discussion of polyalkylphenols can be found, for example, in U.S. Pat. Nos. 4,744,921 and 5,300,701.

Accordingly, the polyalkylphenols of formula II may be prepared from the corresponding olefins by conventional procedures. For example, the polyalkylphenols of formula II above may be prepared by reacting the appropriate olefin or olefin mixture with phenol in the presence of an alkylating catalyst at a temperature of from about 25° C. to 150° C., and preferably 30° C. to 100° C. either neat or in an essentially inert solvent at atmospheric pressure. A preferred alkylating catalyst is boron trifluoride. Molar ratios of reactants may be used. Alternatively, molar excesses of phenol can be employed, i.e., 2 to 3 equivalents of phenol for each equivalent of olefin with unreacted phenol recycled. The latter process maximizes monoalkylphenol. Examples of inert solvents include heptane, benzene, toluene, chlorobenzene and 250 thinner which is a mixture of aromatics, paraffins and naphthenes.

The polyalkyl substituent on the polyalkylphenols employed in the invention is generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The preferred polyisobutenes used to prepare the presently employed polyalkylphenols are polyisobutenes which comprise at least about 20% of the more reactive methylvinylidene isomer, preferably at least 50% and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808. Such polyisobutenes, known as "reactive" polyisobutenes, yield high molecular weight alcohols in which the hydroxyl group is at or near the end of the hydrocarbon chain. Examples of suitable polyisobutenes having a high alkylvinylidene content include Ultravis 30, a polyisobutene having a number average molecular weight of about 1300 and a methylvinylidene content of about 74%, and Ultravis 10, a polyisobutene having a number average molecular weight of about 950 and a methylvinylidene content of about 76%, both available from British Petroleum.

The alkylene carbonates of formula III are known compounds which are available commercially or can be readily prepared using conventional procedures. Suitable alkylene carbonates include ethylene carbonate, propylene carbonate, 1,2-butylene carbonate, 2,3-butylene carbonate, and the like. A preferred alkylene carbonate is ethylene carbonate.

The catalyst employed in the reaction of the polyaklyphenol and alkylene carbonate may be any of the well known hydroxyalkylation catalysts. Typical hydroxyalkylation catalysts include alkali metal hydrides, such as lithium hydride, sodium hydride and potassium hydride, alkali metal hydroxides, such as sodium hydroxide and potassium hydroxide, and alkali metal salts, for example, alkali metal halides, such as sodium chloride and potassium chloride, and alkali metal carbonates, such as sodium carbonate and potassium carbonate. The amount of catalyst employed will generally range from about 0.01 to 1.0 equivalent, preferably from about 0.05 to 0.3 equivalent.

The polyalkylphenol and alkylene carbonate are generally reacted in essentially equivalent amounts in the presence of the hydroxyalkylation catalyst at a temperature in the range of about 100° C. to 210° C., and preferably from about 150° C. to about 170° C. The reaction may take place in the presence or absence of an inert solvent.

The time of reaction will vary depending on the particular alkylphenol and alkylene carbonate reactants, the catalyst used and the reaction temperature. Generally, the reaction time will range from about two hours to about five hours. The progress of the reaction is typically monitored by the evolution of carbon dioxide. At the completion of the reaction, the polyalkylphenoxyalkanol product is isolated using conventional techniques.

The hydroxyalkylation reaction of phenols with alkylene carbonates is well known in the art and is described, for example, in U.S. Pat. Nos. 2,987,555; 2,967,892; 3,283,030 and 4,341,905.

Alternatively, the polyalkylphenoxyalkanol product of formula IV may be prepared by reacting the polyalkylphenol of formula II with an alkylene oxide of the formula:

(V)

wherein $R_1$ and $R_2$ are as defined herein, in the presence of a hydroxyalkylation catalyst as described above.

Suitable alkylene oxides of formula V include ethylene oxide, propylene oxide, 1,2-butylene oxide, 2,3-butylene oxide, and the like. A preferred alkylene oxide is ethylene oxide.

In a manner similar to the reaction with alkylene carbonate, the polyalkylphenol and alkylene oxide are reacted in essentially equivalent or equimolar amounts in the presence of 0.01 to 1.0 equivalent of a hydroxyalkylation catalyst, such as sodium or potassium hydride, at a temperature in the range of about 30° C. to about 150° C., for about 2 to about 24 hours. The reaction may be conducted in the presence or absence of a substantially anhydrous inert solvent. Suitable solvents include toluene, xylene, and the like. Generally, the reaction is conducted at a pressure sufficient to contain the reactants and any solvent present, typically at atmospheric or higher pressure. Upon completion of the reaction, the polyalkylphenoxyalkanol is isolated by conventional procedures.

The polyalkylphenoxyalkanol of formula IV may then be coupled with an appropriate amine component, using phosgene or a phosgene equivalent, to form the desired aminocarbamate of formula I as described in further detail below. Suitable amine reactants which may be employed to form the amine component, i.e., substituent A, of the compounds of the present invention are also discussed more fully below.

B. The Amine Component

As indicated above, the compounds of the present invention contain an amine component which is covalently linked to the aforementioned polyalkylphenoxyalkanol component through a carbamate connecting group.

In general, the amine component will contain an average of at least about one basic nitrogen atom per molecule. A "basic nitrogen atom" is one that is titratable by a strong acid, for example, a primary, secondary, or tertiary amine nitrogen; as distinguished from, for example, an carbamyl nitrogen, e.g., —OC(O)NH—, which is not titratable with a strong acid. Preferably, at least one of the basic nitrogen atoms of the amine component will be primary or secondary amine nitrogen, more preferably at least one will be a primary amine nitrogen.

The amine component of the aminocarbamates of this invention is preferably derived from a polyamine containing about 2 to about 12 amine nitrogen atoms and from about 2 to about 40 carbon atoms. Polyamines having a carbon-to-nitrogen ratio of from about 1:1 to about 10:1 are particularly preferred.

Suitable polyamines can have a straight- or branched-chain structure and may be cyclic, acyclic, or combinations thereof. Generally, the amine nitrogen atoms of such polyamines will be separated from one another by at least two carbon atoms, i.e., polyamines having an aminal structure are not suitable. The polyamine may also contain one or more oxygen atoms, typically present as an ether or a hydroxyl group. Polyamines having a carbon-to-nitrogen ratio of from about 1:1 to about 10:1 are particularly preferred.

In preparing the compounds of this invention using a polyamine where the various nitrogen atoms of the polyamine are not geometrically equivalent, several substitutional isomers are possible and each of these possible isomers is encompassed within this invention.

A particularly preferred group of polyamines for use in the present invention are polyalkylene polyamines, including alkylene diamines. Such polyalkylene polyamines will typically contain about 2 to about 12 nitrogen atoms and about 2 to about 24 carbon atoms. Preferably, the alkylene groups of such polyalkylene polyamines will contain from about 2 to about 6 carbon atoms, more preferably from about 2 to about 4 carbon atoms.

Examples of suitable polyalkylene polyamines include ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

Particularly suitable polyalkylene polyamines are those having the formula:

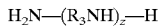

wherein $R_3$ is a straight- or branched-chain alkylene group having about 2 to about 6 carbon atoms, preferably about 2 to about 4 carbon atoms, most preferably about 2 carbon atoms, i.e., ethylene (—$CH_2CH_2$—); and z is an integer from about 1 to about 4, preferably about 1 or about 2.

Particularly preferred polyalkylene polyamines are ethylenediamine, diethylenetriamine, triethylenetetraamine, and tetraethylenepentamine. Most preferred are ethylenediamine and diethylenetriamine, especially ethylenediamine.

Also contemplated for use in the present invention are cyclic polyamines having one or more 5- to 6-membered rings. Such cyclic polyamines compounds include piperazine, 2-methylpiperazine, N-(2-aminoethyl) piperazine, N-(2-hydroxyethyl)piperazine, 1,2-bis-(N-piperazinyl)ethane, 3-aminopyrrolidine, N-(2-aminoethyl) pyrrolidine, and the like. Among the cyclic polyamines, the piperazines are preferred.

Many of the polyamines suitable for use in the present invention are commercially available and others may be prepared by methods which are well known in the art. For example, methods for preparing amines and their reactions are detailed in Sidgewick's "*The Organic Chemistry of Nitrogen*", Clarendon Press, Oxford, 1966; Noller's "*Chemistry of Organic Compounds*", Saunders, Philadelphia, 2nd Ed., 1957; and Kirk-Othmer's "*Encyclopedia of Chemical Technology*", 2nd Ed., especially Volume 2, pp. 99–116.

C. The Carbamate Connecting Group

The carbamate connecting group which covalently links the polyalkylphenoxyalkanol component to the amine component has the formula:

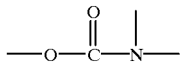

wherein the ether oxygen may be regarded as being derived from the hydroxyl group of a polyalkylphenoxyalkanol of formula IV and the nitrogen atom may be regarded as being derived from a nitrogen atom of a suitable amine component. The carbonyl group, —C(O)—, is preferably provided by a carbonyl-containing coupling agent, such as phosgene or a phosgene equivalent. Suitable phosgene equivalents include, for example, 1,1'-carbonyldiimidazole, trichloromethyl chloroformate (diphosgene), and bis(trichloromethyl) carbonate (triphosgene).

The aminocarbamates of the present invention are conveniently prepared, for example, by contacting a polyalkylphenoxyalkanol of formula IV with 1,1'-carbonyldiimidazole to produce a polyalkylphenoxyalkanol acylimidazole. The acylimidazole is then contacted with a suitable polyamine to afford an aminocarbamate of the polyalkylphenoxyalkanol.

The reaction of the polyalkylphenoxyalkanol of formula IV with 1,1'-carbonyldiimidazole is typically conducted on an essentially equimolar basis, although excess 1,1'-carbonyldiimidazole can be used to increase the yield of the acylimidazole. The reaction may be conducted by contacting the polyalkylphenoxyalkanol with 1,1'-carbonyldiimidazole at temperatures ranging from about −10° C. to about 200° C., typically in an inert solvent, such as benzene, toluene, dichloromethane, and the like, for about 0.25 to about 50 hours.

An aninocarbamate is then formed by contacting the polyalkylphenoxyalkanol acylimidazole with a suitable polyamine at a temperature ranging from about 0° C. to about 150° C. for about 0.01 to about 24 hours. This reaction may be conducted with or without an inert solvent. Suitable inert solvents include benzene, toluene, dichloromethane, and the like. The molar ratio of polyamine to acylimidazole will generally range from about 2:1 to about 20:1, preferably about 5:1 to about 10:1. The desired product may be obtained by washing the reaction mixture with water and stripping the mixture, usually under vacuum, to remove any residual solvent.

Fuel Compositions

The compounds of the present invention are useful as additives in hydrocarbon fuels to prevent and control engine is deposits, particularly intake valve deposits. The proper concentration of additive necessary to achieve the desired deposit control varies depending upon the type of fuel employed, the type of engine, and the presence of other fuel additives.

In general, the concentration of the compounds of this invention in hydrocarbon fuel will range from about 50 to about 2500 parts per million (ppm) by weight, preferably from 75 to 1,000 ppm. When other deposit control additives are present, a lesser amount of the present additive may be used.

The compounds of the present invention may be formulated as a concentrate using an inert stable oleophilic (i.e., dissolves in gasoline) organic solvent boiling in the range of about 150° F. to 400° F. (about 65° C. to 205° C.). Preferably, an aliphatic or an aromatic hydrocarbon solvent is used, such as benzene, toluene, xylene or higher-boiling aromatics or aromatic thinners. Aliphatic alcohols containing about 3 to 8 carbon atoms, such as isopropanol, isobutylcarbinol, n-butanol and the like, in combination with hydrocarbon solvents are also suitable for use with the present additives. In the concentrate, the amount of the additive will generally range from about 10 to about 70 weight percent, preferably 10 to 50 weight percent, more preferably from 20 to 40 weight percent. In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, hydrocarbyl poly(oxyalkylene) aminocarbamates, or succinimides. Additionally, antioxidants, metal deactivators and demulsifiers may be present.

In diesel fuels, other well-known additives can be employed, such as pour point depressants, flow improvers, cetane improvers, and the like.

A fuel-soluble, nonvolatile carrier fluid or oil may also be used with the compounds of this invention. The carrier fluid is a chemically inert hydrocarbon-soluble liquid vehicle which substantially increases the nonvolatile residue (NVR), or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils, such as those described, for example, in U.S. Pat. No. 4,191,537 to Lewis, and polyesters, such as those described, for example, in U.S. Pat. No. 3,756,793 to Robinson and U.S. Pat. No. 5,004,478 to Vogel et al., and in European Patent Application Nos. 356,726, published Mar. 7, 1990, and 382,159, published Aug. 16, 1990.

These carrier fluids are believed to act as a carrier for the fuel additives of the present invention and to assist in removing and retarding deposits. The carrier fluid may also exhibit synergistic deposit control properties when used in combination with a compound of this invention.

The carrier fluids are typically employed in amounts ranging from about 100 to about 5000 ppm by weight of the hydrocarbon fuel, preferably from 400 to 3000 ppm of the fuel. Preferably, the ratio of carrier fluid to deposit control additive will range from about 0.5:1 to about 10:1, more preferably from 1:1 to 4:1, most preferably about 2:1. When employed in a fuel concentrate, carrier fluids will generally be present in amounts ranging from about 20 to about 60 weight percent, preferably from 30 to 50 weight percent.

PREPARATIONS AND EXAMPLES

A further understanding of the invention can be had in the following nonlimiting Examples. Wherein unless expressly stated to the contrary, all temperatures and temperature ranges refer to the Centigrade system and the term "ambient" or "room temperature" refers to about 20° C.–25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume. Where given, proton-magnetic resonance spectrum (p.m.r. or n.m.r.) were determined at 300 mHz, signals are assigned as singlets (s), broad singlets (bs), doublets (d), double doublets (dd), triplets (t), double triplets (dt), quartets (q), and multiplets (m), and cps refers to cycles per second.

Example 1

Preparation of 4-Polyisobutyl Phenol

To a flask equipped with a magnetic stirrer, reflux condenser, thermometer, addition funnel and nitrogen inlet was added 203.2 grams of phenol. The phenol was warmed to 40° C. and the heat source was removed. Then, 73.5 milliliters of boron trifluoride etherate was added dropwise. 1040 grams of Ultravis 10 Polyisobutene (molecular weight 950, 76% methylvinylidene, available from British Petroleum) was dissolved in 1,863 milliliters of hexane. The polyisobutene was added to the reaction at a rate to maintain the temperature between 22° C.–27° C. The reaction mixture was stirred for 16 hours at room temperature. Then, 400 milliliters of concentrated ammonium hydroxide was added, followed by 2,000 milliliters of hexane. The reaction mixture was washed with water (3×2,000 milliliters), dried over magnesium sulfate, filtered and the solvents removed under vacuum to yield 1,056.5 grams of a crude reaction product. The crude reaction product was determined to contain 80% of the desired product by proton NMR and chromatography on silica gel eluting with hexane, followed by hexane: ethylacetate: ethanol (93:5:2).

Example 2

Preparation of

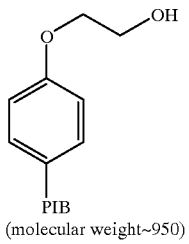

(molecular weight~950)

Potassium hydride (1.1 grams of a 35 weight percent dispersion of in mineral oil) and 4-polyisobutyl phenol (99.7 grams, prepared as in Example 1) were added to a flask equipped with a magnetic stirrer, reflux condensor, nitrogen inlet and thermometer. The reaction was heated at 130° C. for one hour and then cooled to 100° C. Ethylene carbonate (8.6 grams) was added and the mixture was heated at 160° C. for 16 hours. The reaction was cooled to room temperature and one milliliter of isopropanol was added. The reaction was diluted with one liter of hexane, washed three times with water and once with brine. The organic layer was dried over anhydrous magnesium sulfate, filtered and the solvents removed in vacuo to yield 98.0 grams of the desired product as a yellow oil.

Example 3

Preparation of

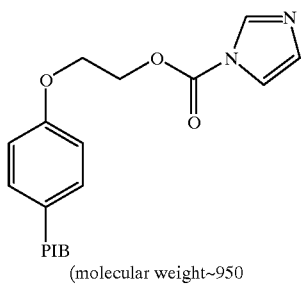

(molecular weight~950

1,1'-Carbonyldiimidazole (8.3 grams) was added to the product from Example 2 (21.8 grams) dissolved in dichloromethane (200 mL). The reaction was stirred under nitrogen at room temperature for 40 minutes and then diluted with dichloromethane (600 mL). Water (800 mL) was added and the mixture was stirred for ten minutes at room temperature. The phases were separated, and the organic phase was dried over anhydrous sodium sulfate, filtered and the solvents removed in vacuo to yield 23.6 grams of the desired product as a yellow oil.

Example 4

Preparation of

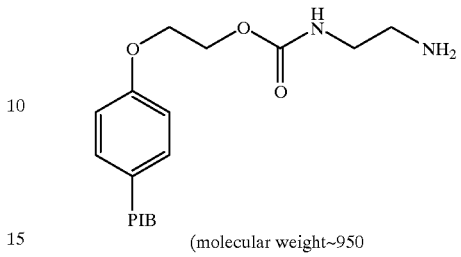

(molecular weight~950)

The product from Example 3 (23.6 grams) dissolved in anhydrous dichloromethane (100 mL) was added dropwise to ethylenediamine (14.0 mL) dissolved in anhydrous dichloromethane (100 mL) under nitrogen at room temperature. The reaction was stirred at room temperature for two hours, diluted with dichloromethane (600 mL), washed twice with water (200 mL), dried over anhydrous sodium sulfate, filtered and the solvents removed in vacuo to yield 23.2 grams of the desired product as a yellow oil. $^1$H NMR (CDCl$_3$) d 7.25 (ABq, 2H), 6.85 (ABq, 2H), 5.3 (bs, 1H), 4.4 (t, 2H), 4.15 (t, 2H), 3.25 (t, 2H), 2.85 (t, 2H), 2.25(bs, 2H), 0.7–1.5 (m, 137H).

Example 5

Preparation of

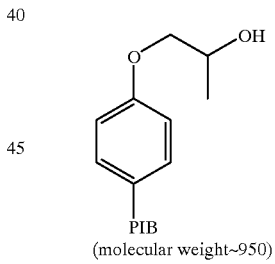

(molecular weight~950)

Potassium hydride (15.1 grams of a 35 weight percent dispersion of in mineral oil) and 4-polyisobutyl phenol (1378.5 grams, prepared as in Example 1) were added to a flask equipped with a mechanical stirrer, reflux condenser, nitrogen inlet and thermometer. The reaction was heated at 130° C. for one hour and then cooled to 100° C. Propylene carbonate (115.7 milliliters) was added and the mixture was heated at 160° C. for 16 hours. The reaction was cooled to room temperature and ten milliliters of isopropanol were added. The reaction was diluted with ten liters of hexane, washed three times with water and once with brine. The organic layer was dried over anhydrous magnesium sulfate, filtered and the solvents removed in vacuo to yield 1301.7 grams of the desired product as a yellow oil.

Example 6
Preparation of

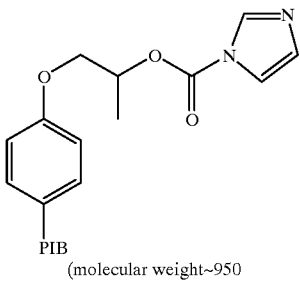

PIB
(molecular weight~950)

1,1'-Carbonyldiimidazole (5.4 grams) was added to the product from Example 5 (14.6 grams) dissolved in dichloromethane (150 mL). The reaction was stirred under nitrogen at room temperature for 40 minutes and then diluted with dichloromethane (450 mL). Water (600 mL) was added and the mixture was stirred for ten minutes at room temperature. The phases were separated, and the organic phase was dried over anhydrous sodium sulfate, filtered and the solvents removed in vacuo to yield 17.7 grams of the desired product as a yellow oil.

Example 7
Preparation of

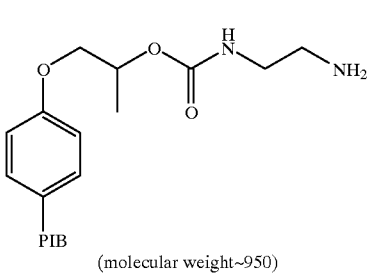

PIB
(molecular weight~950)

The product from Example 6 (17.7 grams) dissolved in anhydrous dichloromethane (100 mL) was added dropwise to ethylenediamine (10.4 mL) dissolved in anhydrous dichloromethane (100 mL) under nitrogen at room temperature. The reaction was stirred at room temperature for sixteen hours, diluted with dichloromethane (600 mL), washed twice with water (200 mL), dried over anhydrous sodium sulfate, filtered and the solvents removed in vacuo to yield a yellow oil. The oil was chromatographed on silica gel, eluting with hexane/diethyl ether/methanol/isopropylamine (40:40:15:5) to yield 12.6 grams of the desired product as a yellow oil. $^1$H NMR (CDCl$_3$) d 7.25 (ABq, 2H), 6.8 (ABq, 2H), 5.15 (m, 1H), 5.05 (bs, 1H), 3.95 (t, 2H), 3.25 (t, 2H), 2.85 (t, 2H), 0.7–1.6 (m, 142H).

Example 8
Single-cylinder Engine Test

The test compounds were blended in gasoline and their deposit reducing capacity determined in an ASTM/CFR single-cylinder engine test.

A Waukesha CFR single-cylinder engine was used. Each run was carried out for 15 hours, at the end of which time the intake valve was removed, washed with hexane and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 400 BTC; engine speed is 1800 rpm; the crankcase oil is a commercial 30 W oil.

The amount of carbonaceous deposit in milligrams on the intake valves is reported in Table I.

TABLE I

| Sample[1] | Intake Valve Deposit weight (in milligrams) | | |
|---|---|---|---|
| | Run 1 | Run 2 | Average |
| Base Fuel | 297.5 | 291.4 | 294.5 |
| Example 4 | 48.0 | 75.9 | 62.0 |

[1] At 125 parts per million actives (ppma).

The base fuel employed in the above single-cylinder engine tests was a regular octane unleaded gasoline containing no fuel detergent. The test compounds were admixed with the base fuel to give the concentrations indicated in the table.

The data in Table I illustrates the significant reduction in intake valve deposits provided by the carbamates of the present invention (Example 4) compared to the base fuel.

What is claimed is:

1. A compound of the formula:

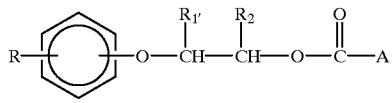

or a fuel-soluble salt thereof, wherein R is a polyalkyl group derived from polyisobutene containing at least 70% of a methylvinylidene isomer and having an average molecular weight in the range of about 600 to 5,000;

$R_1$ is hydrogen and $R_2$ is hydrogen, methyl or ethyl; and

A is a polyamine moiety having at least one basic nitrogen atom, wherein the polyamine is connected to the carbonyl group through one of its nitrogen atoms to form a carbamate linkage.

2. The compound according to claim 1, wherein R is a polyalkyl group having an average molecular weight in the range of about 600 to 3,000.

3. The compound according to claim 2, wherein R is a polyalkyl group having an average molecular weight in the range of about 700 to 3,000.

4. The compound according to claim 3, wherein R is a polyalkyl group having an average molecular weight in the range of about 700 to 2,000.

5. The compound according to claim 1, wherein A is a polyamine moiety having from about 2 to about 12 amine nitrogen atoms and from about 2 to about 40 carbon atoms.

6. The compound according to claim 5, wherein A is a polyamine moiety derived from a polyalkylene polyamine containing from about 2 to about 12 amine nitrogen polyamine atoms and from about 2 to about 24 carbon atoms.

7. The compound according to claim 6, wherein the polyalkylene polyamine has the formula:

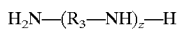

wherein $R_3$ is an alkylene group having from about 2 to about 6 carbon atoms and z is an integer from about 1 to about 4.

8. The compound according to claim 7, wherein $R_3$ is an alkylene group having from about 2 to about 4 carbon atoms.

9. The compound according to claim 8, wherein the polyalkylene polyamine is ethylene diamine or diethylene triamine.

10. The compound according to claim 9, wherein the polyalkylene polyamine is ethylene diamine.

11. A fuel composition comprising a major amount of hydrocarbons boiling in the gasoline or diesel range and an effective deposit-controlling amount of a compound of the formula:

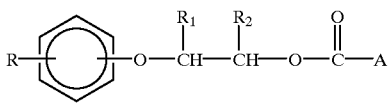

or a fuel-soluble salt thereof, wherein R is a polyalkyl group derived from polyisobutene containing at least 70% of a methylvinylidene isomer and having an average molecular weight in the range of about 600 to 5,000;

$R_1$ is hydrogen and $R_2$ is hydrogen, methyl or ethyl; and

A is a polyamine moiety having at least one basic nitrogen atom, wherein the polyamine is connected to the carbonyl group through one of its nitrogen atoms to form a carbamate linkage.

12. The fuel composition according to claim 11, wherein R is a polyalkyl group having an average molecular weight in the range of about 600 to 3,000.

13. The fuel composition according to claim 12, wherein R is a polyalkyl group having an average molecular weight in the range of about 700 to 3,000.

14. The fuel composition according to claim 13, wherein R is a polyalkyl group having an average molecular weight in the range of about 700 to 2,000.

15. The fuel composition according to claim 11, wherein A is a polyamine moiety having from about 2 to about 12 amine nitrogen atoms and from about 2 to about 40 carbon atoms.

16. The fuel composition according to claim 15, wherein A is a polyamine moiety derived from a polyalkylene polyamine containing from about 2 to about 12 amine nitrogen polyamine atoms and from about 2 to about 24 carbon atoms.

17. The fuel composition according to claim 16, wherein the polyalkylene polyamine has the formula:

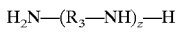

wherein $R_3$ is an alkylene group having from about 2 to about 6 carbon atoms and z is an integer from about 1 to about 4.

18. The fuel composition according to claim 17, wherein $R_3$ is an alkylene group having from about 2 to about 4 carbon atoms.

19. The fuel composition according to claim 18, wherein the polyalkylene polyamine is ethylene diamine or diethylene triamine.

20. The fuel composition according to claim 19, wherein the polyalkylene polyamine is ethylene diamine.

21. The fuel composition according to claim 11, wherein the composition contains from about 50 to about 2,000 parts per million by weight of said compound.

22. The fuel composition according to claim 11, where the composition further contains from about 100 to about 5,000 parts per million by weight of a fuel-soluble, nonvolatile carrier fluid.

23. A fuel concentrate comprising an inert stable oleophilic organic solvent boiling in the range of from about 150° F. to 400° F. and from about 10 to about 70 weight percent of a compound of the formula:

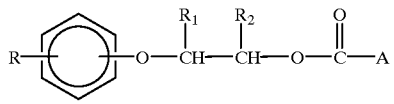

or a fuel-soluble salt thereof, wherein R is a polyalkyl group derived from polyisobutene containing at least 70% of a methyl vinylidene isomer and having an average molecular weight in the range of about 600 to 5,000;

$R_1$ is hydrogen and $R_2$ is hydrogen, methyl or ethyl; and

A is a polyamine moiety having at least one basic nitrogen atom, wherein the polyamine is connected to the carbonyl group through one of its nitrogen atoms to form a carbamate linkage.

24. The fuel concentrate according to claim 23, wherein R is a polyalkyl group having an average molecular weight in the range of about 600 to 3,000.

25. The fuel concentrate according to claim 24, wherein R is a polyalkyl group having an average molecular weight in the range of about 700 to 3,000.

26. The fuel concentrate according to claim 25, wherein R is a polyalkyl group having an average molecular weight in the range of about 700 to 2,000.

27. The fuel concentrate according to claim 23, wherein A is a polyamine moiety having from about 2 to about 12 amine nitrogen atoms and from about 2 to about 40 carbon atoms.

28. The fuel concentrate according to claim 27, wherein A is a polyamine moiety derived from a polyalkylene polyamine containing from about 2 to about 12 amine nitrogen polyamine atoms and from about 2 to about 24 carbon atoms.

29. The fuel concentrate according to claim 28, wherein the polyalkylene polyamine has the formula:

wherein $R_3$ is an alkylene group having from about 2 to about 6 carbon atoms and z is an integer from about 1 to about 4.

30. The fuel concentrate according to claim 29, wherein $R_3$ is an alkylene group having from about 2 to about 4 carbon atoms.

31. The fuel concentrate according to claim 30, wherein the polyalkylene polyamine is ethylene diamine or diethylene triamine.

32. The fuel concentrate according to claim 31, wherein the polyalkylene polyamine is ethylene diamine.

33. The fuel concentrate according to claim 23, wherein the fuel concentrate further contains from about 20 to about 60 weight percent of a fuel-soluble, nonvolatile carrier fluid.

\* \* \* \* \*